INVENTORS.
Robert N. Knosp.
BY Carl E. Linden.
Frank O. Wetzel.
Wood, Herron & Evans.
ATTORNEYS.

Nov. 8, 1955
R. N. KNOSP ET AL
2,722,853
AUTOMATIC CLUTCH CONTROLLED TRAVERSE
AND POSITIONING APPARATUS
Filed Nov. 14, 1951
6 Sheets-Sheet 3
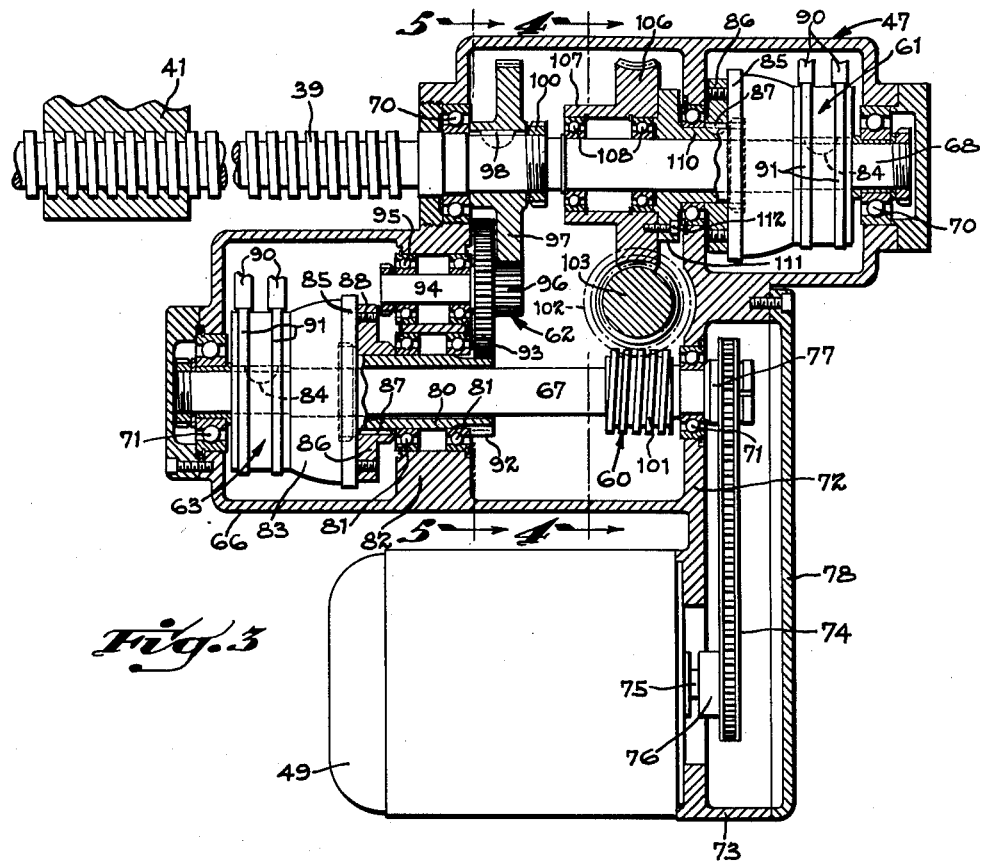
Fig. 3
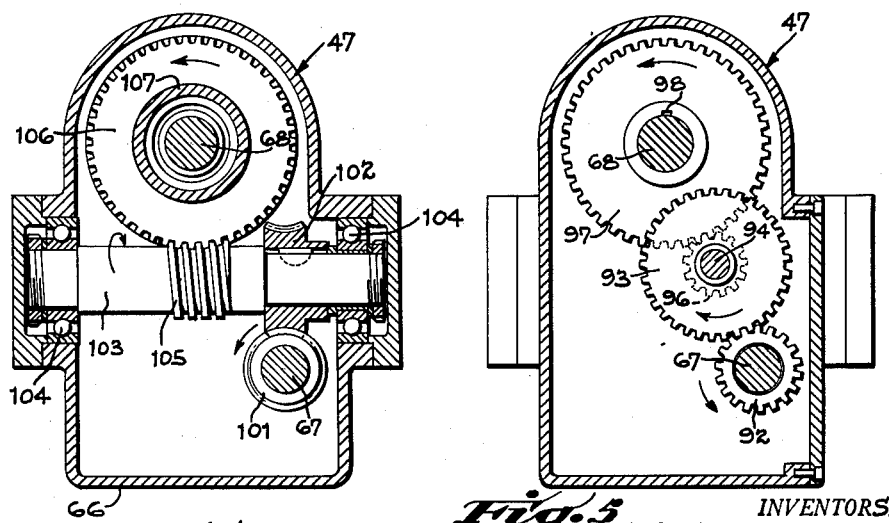
Fig. 4
Fig. 5
INVENTORS.
Robert N. Knosp.
BY Carl E. Linden.
Frank O. Wetzel.
Wood, Herron & Evans.
ATTORNEYS.

Nov. 8, 1955  R. N. KNOSP ET AL  2,722,853
AUTOMATIC CLUTCH CONTROLLED TRAVERSE
AND POSITIONING APPARATUS
Filed Nov. 14, 1951  6 Sheets-Sheet 4

INVENTORS.
Robert N. Knosp.
BY Carl E. Linden.
Frank O. Wetzel.
Wood, Herron & Evans.
ATTORNEYS.

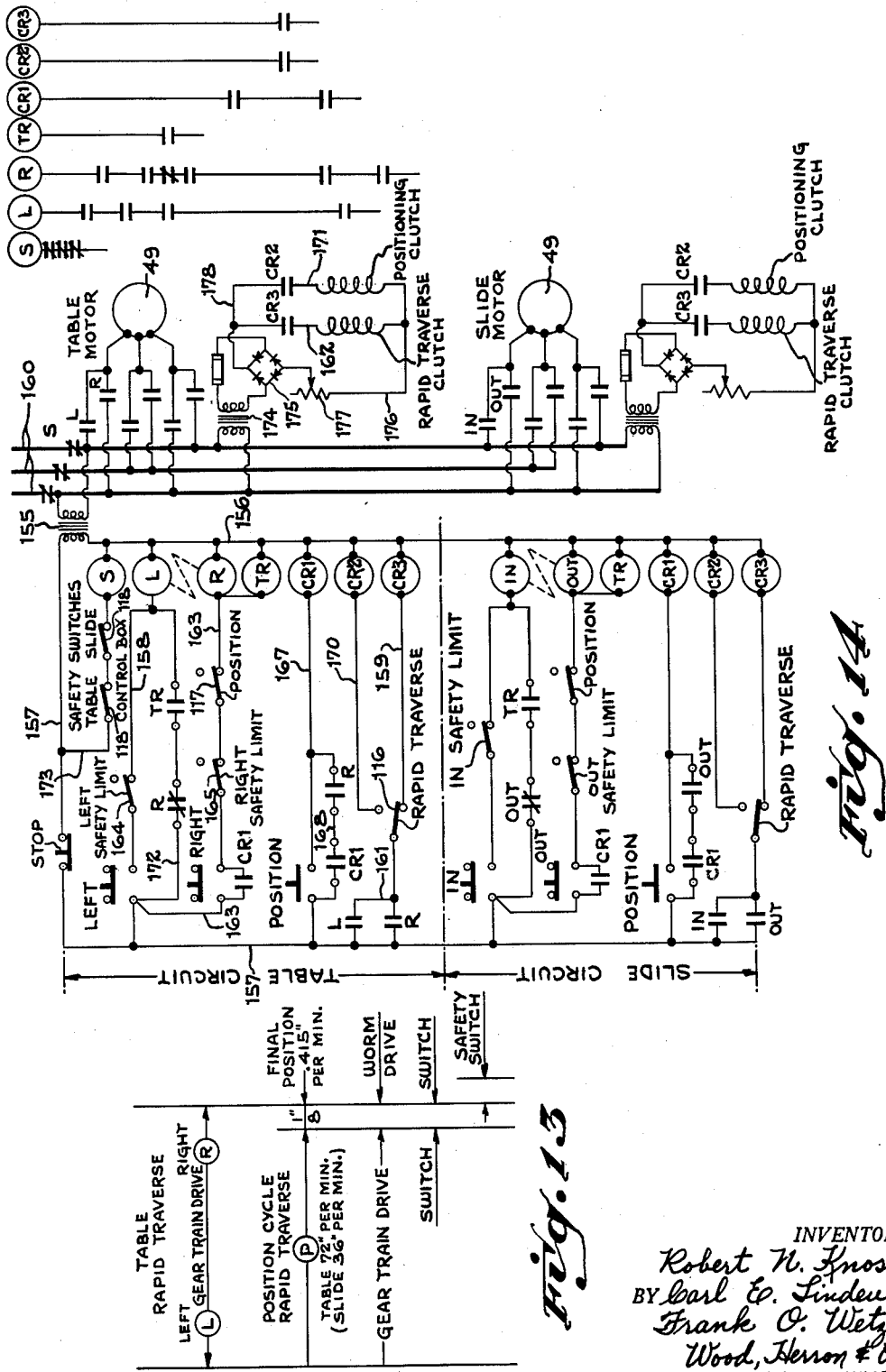

United States Patent Office 2,722,853
Patented Nov. 8, 1955

2,722,853

AUTOMATIC CLUTCH CONTROLLED TRAVERSE AND POSITIONING APPARATUS

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application November 14, 1951, Serial No. 256,174

6 Claims. (Cl. 77—1)

This invention relates to an automatic apparatus for shifting accurately to a predetermined position the movable member or members of a machine tool with respect to a stationary bed or similar part; for example, in producing the rapid traverse and positioning movements of the slide and work table of a jig boring machine. The apparatus is disclosed in relation to a jig boring machine as a typical illustration of its utility but it will be understood that the apparatus is not limited in use to such machines.

Jig boring machines are used extensively in locating the holes of jigs and in the rapid production of work pieces which require precision centering and machining of holes. The usual jig boring machine is provided with a stationary bed having a vertical column which carries a vertically translatable tool spindle. Upon the bed there is mounted a transversely movable slide and the slide in turn carries a table which is shiftable longitudinally with respect to the slide. The work is clamped upon the table and by the combined positioning movements of the slide end table, various hole centers in both directions can be located accurately with respect to the axis of the spindle. Since the positioning apparatus is in duplicate for the slide and table, the term "movable member" or "sliding member" is used in this description to designate either the table or slide.

A positioning apparatus adapted to shift the slide and table automatically to locate hole centers automatically is disclosed in the copending application of Robert N. Knosp, Carl E. Linden and Frank O. Wetzel, entitled, "Automatic Traverse and Positioning Apparatus for Machine Tools," Serial No. 167,346, filed June 10, 1950. The present apparatus follows the operating principles of the prior application in all respects but utilizes a different type of drive for imparting the rapid traverse and positioning movements to the movable member.

Briefly, the prior application discloses a jig boring machine in which the slide and table are automatically shifted at rapid traverse rate during the major portion of travel and at a slow positioning rate during final movement. For this purpose, each movable member is provided with two motors, one constituting a rapid traverse motor and the other a positioning motor. The rapid traverse motor is connected to a screw shaft and the final positioning motor is connected to a rotatable nut threaded upon the screw shaft and driven by a high reduction worm box transmission. The worm box is mounted upon the movable member and connected to the positioning motor by a splined shaft extending parallel to the screw shaft. After the sliding member is rapid traversed by rotation of the screw shaft within a fraction of an inch of final position, the rapid traverse motor is stopped and the positioning motor is energized, thereby rotating the nut slowly with respect to the screw shaft until the final position is reached.

The operation of the two motors is regulated in an automatic manner by control boxes, one for each movable member, each box having switches in electrical connection with a control circuit providing a sequential cycle of automatic operation. The control box switches are tripped by measuring rods which are placed in abutment between the sliding member and a spring loaded plunger in the control box, the arrangement being such that the plunger is preloaded, causing the final position switch to stop the movable member at final position when the measuring rods develop a predetermined pressure against the plunger. In actual practice the arrangement is found to locate holes consistently within a tolerance of ±.0001 under automatic cyclic operation.

The use of two motors for each movable member is highly practical and the machines of the prior application are in extensive use in the industry. However, it is recognized, that because of economic conditions, the supply of electric motors may become a critical factor in the production of the machines.

A primary object of the present invention therefore, has been to provide a modified positioning apparatus utilizing the same general principles as the prior apparatus and capable of the same degree of precision and speed, but using a single motor for each movable member.

Briefly, the present modification employs a single motor selectively coupled to a two-speed driving system by means of two electrically operated clutches, one of which drives a rapid traverse gear train while the other drives a compound worm and worm wheel drive for positioning. The two-speed driving system is in driving connection with a lead screw shaft connected to the movable member such that the shaft itself is rotated both during rapid traverse and during final positioning instead of the nut being rotated during final positioning. The modified apparatus thus performs the same cyclic operation as that of the prior application, but does not utilize the positioning motor, splined shaft, and the worm box used in the prior application for driving the nut. In the present structure, the rotatable nut is replaced with a fixed nut bolted directly to the movable member and the positioning speed reduction is produced by the clutch driven compound worm drive.

The present apparatus is regulated by measuring rods and pressure responsive control boxes having switches interconnected in a control circuit in substantially the same manner as in the copending application. Also, the clutches are energized in the same sequence during the final positioning cycle as the rapid traverse and positioning motors of the prior application.

As outlined in the copending application, it has been found that the operation of the positioning apparatus develops certain vibrations having a tendency to displace the sliding member slightly from its final indexed position. This is noticeable in a jig boring machine when one sliding member has reached its final stationary position while the other member is still moving toward final position. In order to overcome this, the present apparatus includes means for reversing the screw shaft to introduce back lash between the screw threads as disclosed in the copending application.

The present apparatus also includes a manual control station having push buttons interconnected in the electrical system. These buttons permit manual rapid traverse of the slide and table selectively in either direction and are used primarily in setting up the machine. The control station includes a push button for placing the apparatus under automatic positioning control after the machine is set up for operation. The control station and automatic control units are structurally the same as disclosed in the copending application except that they control the electric clutches instead of separate traverse and positioning motors.

Various other features and advantages of the present invention are brought out in detail in the following description taken in conjunction with the drawings.

In the drawings:

Figure 3 is an enlarged sectional view taken on line 3—3, Figure 2, detailing the driving system for producing rapid traverse and positioning movements of the slide. A duplicate of this driving system, not illusrtated, is also applied to the table.

Figure 4 is a sectional view taken on line 4—4, Figure 3, further detailing the compound worm and worm wheel positioning drive.

Figure 5 is a sectional view taken on line 5—5, Figure 3, detailing the rapid traverse gear drive.

Figure 13 is a motion diagram illustrating the movements executed by the cross slide and table during automatic operation and also under manual control.

Figure 14 is an electrical diagram illustrating the circuit for controlling the positioning apparatus of the slide and table.

Figure 1:
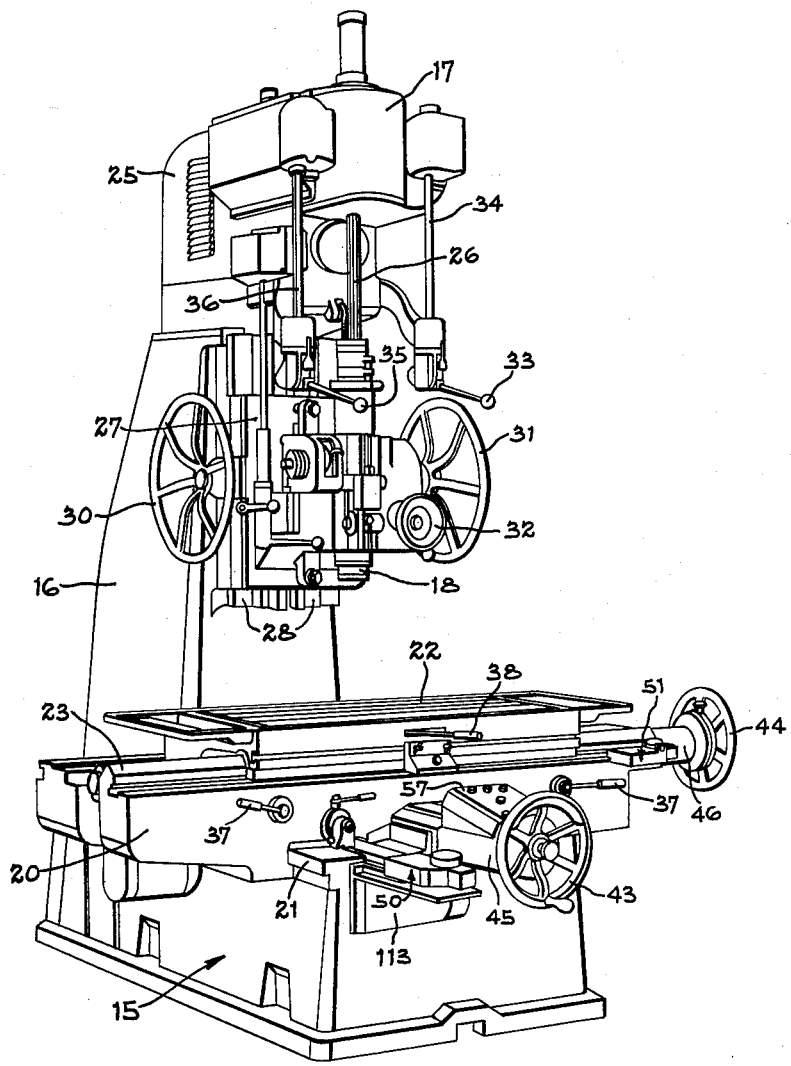
Figure 1 is a general perspective view of a jig boring machine embodying the present invention.

Since the present apparatus is disclosed in conjunction with the slide and table of a jig boring machine, a general description of the machine will be helpful in comprehending the construction and operation of the apparatus. Referring to Figure 1, the machine includes a bed indicated generally at 15, a column 16 rising from the bed, with a transmission 17 carried upon the upper end of the column. A spindle 18 extends downwardly from the transmission and projects downwardly toward the bed.

Slidably mounted upon the bed 15, there is provided a cross slide 20 carried upon ways 21 for movement in the transverse direction. The work supporting table 22 is slidably mounted upon the ways 23 of the slide for movement longitudinally with respect to the slide. The work piece (not shown) is clamped upon the table 22 and the hole centers are located by the combined transverse and longitudinal movements of the slide and table with respect to the spindle under control of the positioning apparatus. The spindle includes a chuck suitable for mounting the various boring tools, drills, reamers which may be required for the various operations. These tools are well known in the industry and are omitted from the drawings.

The spindle is driven by a spindle motor 25 in driving connection with the transmission 17 and the spindle is connected to the transmission by a splined shaft 26. The splined shaft extends downwardly from the transmission to a sliding head 27, the spindle 18 being rotatably journalled in the head and slidably connected to the splined shaft 26. The sliding head is mounted upon ways 28 formed on the column and is adjusted vertically by means of the hand wheel 30 and the spindle is adjusted vertically relative to the head by the hand wheel 31. A fine spindle feed is provided by the small hand wheel 32 to provide close regulation of the feed rate during machining operations.

The spindle also is fed vertically by power at a selected rate by operation of a feed control lever 33 which is connected by shaft 34 to a suitable feed mechanism within the transmission 17. The rate of spindle rotation is regulated by a speed selecting lever 35 also connected by a shaft 36 to mechanism for shifting the speed change gears of the transmission 17.

After the slide and table are shifted to final position with the hole center aligned with the spindle, both the slide and table are clamped firmly in position before feeding the spindle to the work. The clamping mechanism (not shown) is actuated by the hand levers 37 and 38 for the slide and table respectively.

*Slide and table*

Figure 2:
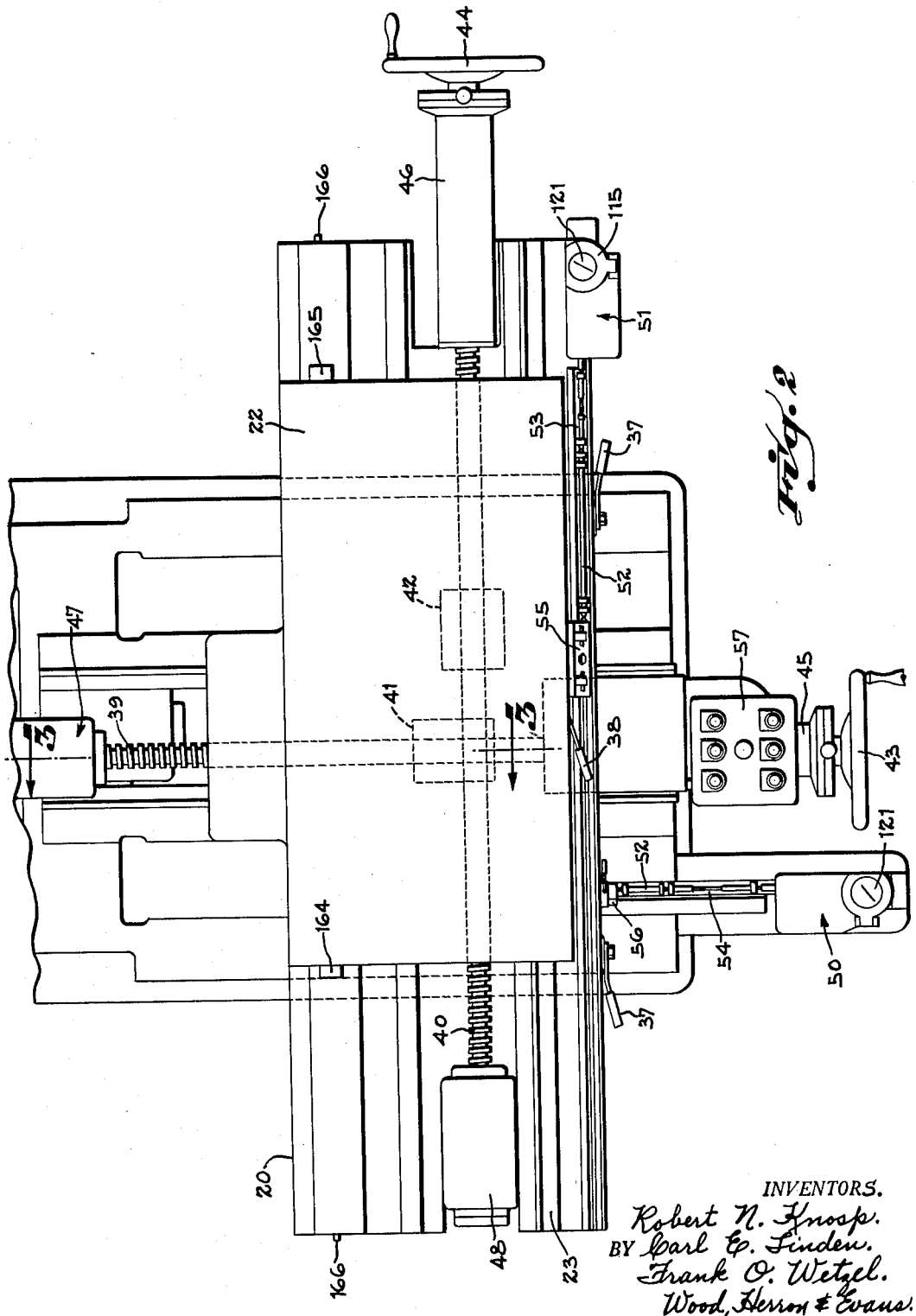
Figure 2 is an enlarged fragmentary top plan view showing the slide and table of the machine, illustrating generally the rapid traverse and positioning apparatus.

The cross slide 20 and work table 22 are shifted in traverse and positioning movements by the lead screw shafts 39 and 40 (Figure 2). The screw shaft 39 for the slide is journalled on the bed and is threaded through a nut 41 secured to the bottom of the slide. Screw shaft 40 for the table is journalled upon the cross slide and threaded through a nut 42 secured to the bottom of the table. Under automatic operation the screw shafts are driven by individual motors, and for hand operation, the outer end of each screw shaft is provided with a hand wheel indicated at 43 and 44 respectively. The hand wheels are mounted in housings 45 and 46 which include the usual indicating dials for hand adjustment of the slide and table. The structural details of the hand wheel arrangement are not relevant to the present invention and have been omitted from the disclosure.

As shown generally in Figure 2, the end of the slide screw shaft 39, opposite to its hand wheel, is journalled in a transmission housing 47, mounted upon the bed. The corresponding end of shaft 40 for the table is journalled in a similar transmission housing 48 mounted upon the cross slide. Each housing includes the two-speed driving system consisting of the rapid tranverse gear train and compound worm wheel drive, powered in common by an individual motor 49 as shown in Figure 3. The motor drives the screw shaft selectively at rapid traverse speed or at positioning speed by operation of the traverse or positioning clutches, which are electrically energized. When the machine is set up for manual operation, the electric clutches are deenergized, leaving the shafts free to be rotated manually by the hand wheels.

Described in general with reference to Figures 3 to 5, the positioning apparatus is duplicated for the table and slide respectively and since the parts are the same, the description is confined to the cross slide drive illustrated in Figure 3. Under power operation, the cross slide and table move independently of one another, each motor being controlled by an individual control box of the type disclosed in the copending application. As shown in Figure 2, movements of the cross slide are controlled by the control box 50 and movements of the table are controlled by the box 51. Sets of measuring rods for the respective control boxes are indicated in both instances by the numeral 52, the measuring rods for the table being supported in a V-shaped channel 53 formed in the upper surface of the cross slide while the rods for the slide are confined in a channel 54 formed in the bed of the machine.

The measuring rods are confined endwisely between the actuating stems of the control boxes and adjustable dogs attached respectively to the table as at 55 and to the cross slide at 56. The arrangement is such that under automatic operation, the control boxes condition the control circuit, which in turn operates the electric clutches in sequence, causing rapid traverse and final positioning of the slide and table. The construction and operation of the control boxes and control circuit is similar to the copending application and is described in greater detail following the description of the automatic rapid traverse and positioning driving system.

Driving system

The two-speed driving system for traverse and positioning movements of the slide is illustrated in Figures 3 to 5 inclusive and the following detailed description relates to the slide driving system, the table driving system being identical. As previously indicated, the transmission housing 47 for the slide is mounted upon the bed and the transmission housing 48 for the table is mounted upon the cross slide. Rotation of the screw shaft 39 of the cross slide will therefore move both the slide and the table and rotation of the table screw shaft 40 will shift the table with respect to the slide. In operation, both the slide and table driving systems may be operated concurrently or individually as desired, by depressing the control buttons of the manual control panel 57, Figures 2 and 12.

As shown in these views, there is provided a set of three buttons for regulating the shifting of the table and three buttons for regulating the shifting of the slide. These buttons are interconnected in the control circuit as later described and provide rapid traverse in either direction under manual control or a combination of traverse and positioning feeds under automatic control. For example, the table "left" and "right" button will set up the control circuit to energize the clutch and reversible motor to shift the table to the left or right at rapid traverse speed.

The button labeled "position" will condition the control circuit to cause shifting of the table toward the right at traverse speed until the stop dog contacts the measuring rods and actuates the control box. The control box then conditions the control circuit for positioning speed which prevails until final position is reached. At final position the motor is plugged to a stop then reversed sufficiently to introduce back lash in the screw threads.

The movements of the slide in a similar manner are controlled by the buttons marked "in" and "out," these buttons being arranged to cause the cross slide to move at rapid traverse speed in either direction so long as the button is held down. When the button indicated "position" is depressed, the apparatus is placed under automatic control causing the slide to move outwardly and execute the positioning cycle described above. The control panel also includes a "stop" button which deenergizes the control circuit and stops the motors of the slide and table in emergency.

Described with reference with Figures 3 to 5, the driving system for the cross slide in general consists of the reversible motor 49, a compound worm and worm wheel drive indicated generally at 60, and an electrically operated positioning clutch 61 adapted to couple the positioning drive to the screw shaft. The rapid traverse drive consists of the rapid traverse gear train indicated generally at 62 and the electrically operated clutch at 63 which is adapted to complete the drive from the reversible motor to the screw shaft for rapid traverse of the slide. The clutches 61 and 62 include coils which upon being energized provide a magnetic driving connection.

When the slide is traversed by manual operation of the "in" or "out" traverse buttons, the motor is energized in the appropriate direction and the magnetic clutch 63 is engaged electrically to complete the drive from the motor through the rapid traverse gear train 62 to the screw shaft 39. This also occurs during the preliminary movement when the apparatus is placed under automatic positioning control by depressing the positioning button.

Under automatic positioning, the motor 49 is driven automatically in the direction to move the slide outwardly toward the measuring rods. As the slide approaches its final position, the magnetic clutch 63 is deenergized to uncouple the rapid traverse drive 62 and the compound worm wheel drive 60 is coupled by means of the magnetic clutch 61. The rapid traverse gear train for the slide in the present instance is arranged to provide a positioning speed of 36" per minute and worm wheel drive provides a positioning rate of .415" per minute. Because of its increased range of travel, the table is traversed at the rate of 72" per minute; however, its final positioning rate is also .415" per minute.

After the slide reaches its final position with the hole center of the work piece in accurate alignment with the spindle, the motor 49 is reversed momentarily at the final limit of travel in order to unstress the screw shaft before clamping the slide. These various operations occur automatically in proper sequence in response to the movement of the measuring rods as later explained in detail.

Described in detail, the slide driving system shown in Figure 3 consists of the transmission housing 47, journalling the screw shaft 39 and a lower housing 66 journalling a countershaft 67 which is common to the positioning worm drive 60 and rapid traverse gear drive 62. The end of the screw shaft includes a counterturned portion 68 extending into housing 47 and rotatably journalled upon a pair of spaced ball bearings 70—70 which are mounted in bores formed in the housing. The countershaft 67 is journalled in a pair of ball bearings 71—71 mounted in the lower housing 66. The end wall 72 of the lower housing includes a shallow depending housing 73 for mounting the motor 49 and a driving connection from the motor to the countershaft is provided by a silent chain 74. The motor shaft 75 includes a sprocket 76, the countershaft 67 includes a similar sprocket 77 and silent chain 74 passes over these sprockets. The chain is enclosed by a cover plate 78 secured upon the housing 73 and secured by screws.

The rapid traverse gear train 62 includes a sleeve 80 surrounding the countershaft 67 and journalled upon ball bearings 81 mounted in the intermediate wall 82 of the lower housing. Sleeve 80 extends into the magnetic clutch 63 and is adapted to be rotated in unison with shaft 67 when the clutch is energized.

The magnetic clutches are commercial products and are therefore not disclosed in detail. Described generally, the rapid traverse clutch 63 consists of an external housing 83 which is keyed as at 84 to countershaft 67, so that the housing rotates with the shaft. The clutch includes a driving member (not shown) which is magnetically coupled for rotation when the clutch is energized. This member includes a flange 85 which is connected to sleeve 80, providing a driving connection. For this purpose, sleeve 80 includes a driving ring 86 keyed as at 87 to the sleeve and the driving ring is secured to the clutch flange by screws 88. The clutch is so arranged that the housing 83 is free to rotate with shaft 67 relative to the driven member and flange 85 when the clutch is deenergized and to establish the driving connection from the flange 85 to the sleeve 80 when the clutch is energized. In short, when the clutch is deenergized, the sleeve 80 remains stationary and when energized, the sleeve rotates in unison with the countershaft 67. Electrical energy is conducted to the clutch from the control system by way of the brushes 90—90 which contact the slip rings 91—91 mounted on the clutch housing.

The rapid traverse gear train extending from the clutch consists of the pinion teeth 92 formed on the outer end of sleeve 80 and meshing with gear 93. Gear 93 is mounted upon a short countershaft 94 loosely journalled upon ball bearings 95 mounted in the intermediate wall 82. Gear 93 includes a pinion 96 meshing with a gear 97 which is keyed as at 98 upon the counterturned portion 68 of the screw shaft 39. Gear 97 is locked against displacement by means of the lock nut 100 which is threaded upon shaft 68. Rotation of the countershaft 67 will therefore be transmitted by way of the magnetic clutch 63 to the sleeve 80 and from the sleeve by way of gear 93, pinion 96 and gear 97 to the screw shaft.

The compound worm and worm wheel drive 60 starts with the worm 101 formed on countershaft 67 and meshing with a worm wheel 102 keyed upon a cross shaft 103. As shown in Figure 4, cross shaft 103 is loosely journalled on ball bearings 104—104 mounted in the housing 47. A worm 105 is formed on shaft 103 and meshes with the worm wheel 106 having a hub 107 which is loosely journalled by ball bearings 108 on shaft 68.

It will be apparent at this point that rotation of countershaft 68 will rotate the worm wheel 106 at a greatly reduced rate, but that no movement will be imparted to the screw shaft since the worm wheel is loosely journalled upon the shaft. The driving connection from the worm wheel to the screw shaft is provided by the positioning clutch 61.

This clutch is a duplicate of the magnetic clutch 63 above described and includes a similar driving flange 85 as previously described. In this case the clutch housing is keyed as at 84 to the screw shaft and the flange 85 is free to rotate when the clutch is deenergized. Flange 85 is connected to a driving ring 86 which is keyed as at 87 to a sleeve 110. Sleeve 110 is loosely journalled on the counterturned portion 68 of the screw shaft and includes a flange 111 secured by screws 112 to worm wheel 106. When the clutch is energized a driving connection is established from the worm wheel 106 to the counterturned shaft 68, thereby rotating the screw shaft at positioning speed.

It is to be noted at this point that the rapid traverse gear train and positioning worm drive both rotate the screw shaft in the same direction when the motor is rotating in a given direction as indicated by the arrows in Figures 4 and 5. It will also be apparent that the clutches are arranged for alternate engagement so that both driving systems cannot operate at the same time. For this purpose the control circuit is provided with suitable interlocks as described later.

*Automatic control box*

The control boxes 50 and 51 for the cross slide and table are in duplicate and are similar to those of the copending application. As disclosed in Figure 1, the control box 50 for the slide is mounted upon a bracket 113 secured upon the forward side of the bed at the left, and the box 51 for the table is mounted directly upon the right end of the slide. As shown in Figures 6 to 11, each control box consists of a housing 114 enclosing a dial indicator 115, a rapid traverse switch 116, a positioning switch 117 and a safety switch 118. These preferably are micro-switches having poles which are responsive to very slight movements to open and close their circuits. The function of the switches is disclosed later with reference to the circuit diagram illustrated in Figure 14.

The switches control the operation of the rapid traverse and positioning clutches 61 and 63 in response to movement of a plunger 119 slidably mounted within casing 114 and preloaded by the compression spring 120. The plunger is contacted by the measuring rods and movement of the plunger is adapted to trip the switches to provide rapid traverse and accurate final positioning. As above noted, the switches are interconnected in the control circuit and arranged to actuate the rapid traverse and positioning clutches in response to the movement imparted by the measuring rods to the plunger 119.

The dial indicator 115 preferably is calibrated in ten thousandths of an inch graduations and its dial face 121 is capable of being adjusted relative to the pointer. When the machine is set up for automatic operation the dial is usually adjusted to a zero position with respect to the pointer with the spindle located accurately upon its hole center and with the measuring rods engaged under predetermined preload pressure between the dog and plunger. Therefore, upon subsequent operations, the dial will swing from zero position when the sliding member is moved away from the control unit in placing the measuring rods. When the sliding member moves toward the control box during the positioning cycle and reaches final position, the dial indicator will swing back to its zero position to indicate the true position of the sliding member relative to the spindle.

The purpose of the indicating dial and spring loaded plunger is to provide a predetermined and constant loading upon the measuring rods. This eliminates excessive pressure upon the rods, which, in precision boring can vary the setting of the machine due to the slight yielding of the parts under pressure.

Figure 7:
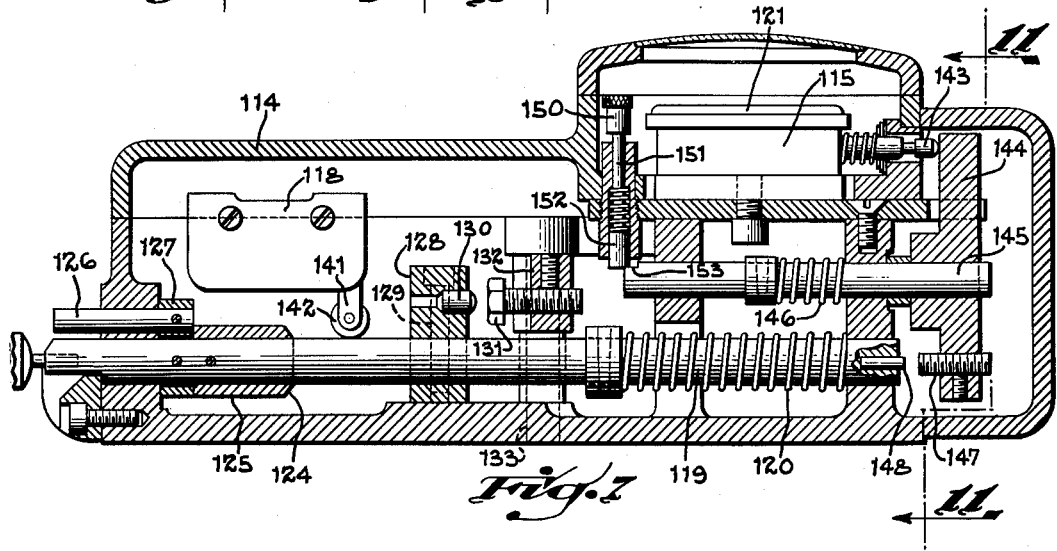
Figure 7 is a longitudinal sectional view taken on line 7—7, Figure 6, illustrating the general arrangement of the switches, dial indicator and associated mechanism of the control box.
Figure 9:
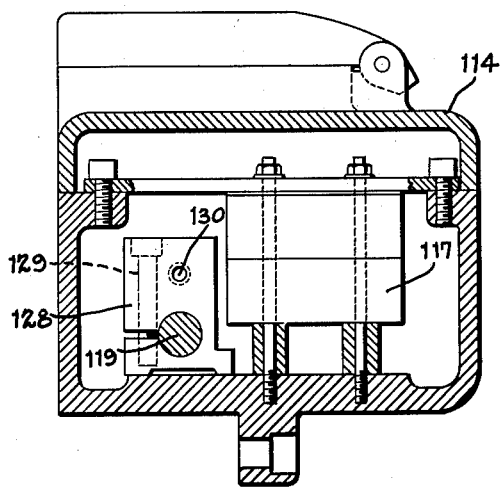
Figure 9 is a sectional view taken on line 9—9, Figure 6, illustrating the mounting arrangement for the final positioning switch.
Figure 10:
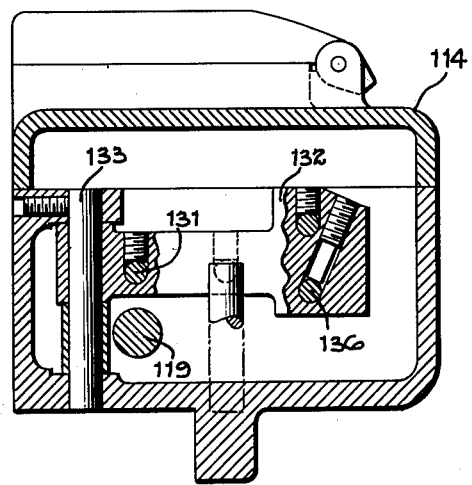
Figure 10 is a sectional view taken on line 10—10, Figure 6, detailing the lever arrangement for tripping the final positioning switch.
Figure 11:
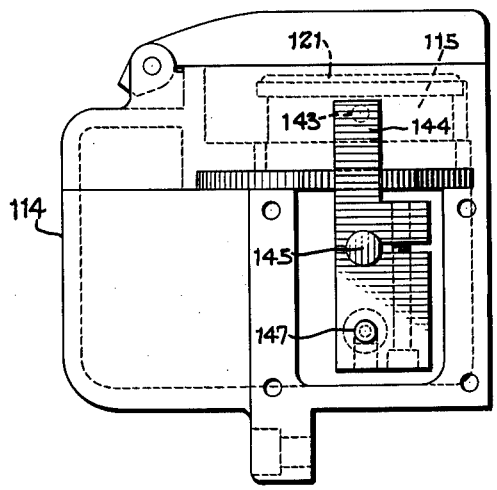
Figure 11 is an end view of the control unit as viewed along the line 11—11, Figure 7, with the cover removed, illustrating the actuating mechanism for the dial indicator.

Described in greater detail, the rapid traverse switch 116 is provided with a stem 122 having a roller 123 arranged to cam against the tapered end 124 of an actuating sleeve 125 which is pinned to the plunger 119. For manual testing and tripping there is provided a pin 126 (Figure 7) extending through the housing and having its inner end fixed to a collar 127 which abuts the sleeve 125. During rapid traverse the roller 123 of the rapid traverse switch bears against plunger 119 and cams up the tapered end of the sleeve 124 when the measuring rods begin to shift plunger 119. This movement trips the rapid traverse switch and deenergizes the rapid traverse clutch 63 and energizes the positioning clutch 61. As the sliding member advances still further, plunger 119 continues its inward movement carrying with it the abutment block 128 which is clamped to the plunger by a screw 129 (Figures 7 and 9). This block includes a stud 130 which engages a set screw 131 adjustably threaded through a lever 132 which increases the movement of the plunger 119 in order to trip the final positioning switch with greater precision.

For this purpose the end of the lever 132 is pivotally mounted upon a stub shaft 133, the free end of the lever being extended into operating relationship with the stem 134 of the final positioning switch. An adjustable stud 136 is threaded through the swinging end of lever 132 in a position to engage the switch stem 134.

The final positioning switch 117 sets up the control circuit to stop the motor 49 upon being tripped at final position and to reverse the motor as outlined above to relieve the stress on the screw shaft at final position. Switch 117 is arranged to trip consistently at a predetermined point as stud 136 moves away from the switch stem 134. The lever 132 is normally maintained in the position shown in Figure 6 by a compression spring 137 and the lever is backed up against a stop 138.

Figure 6:
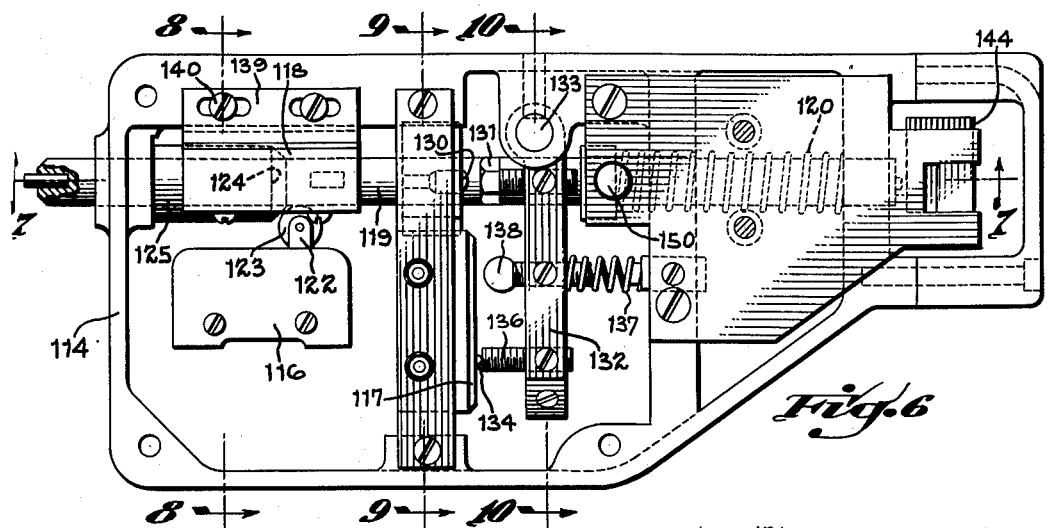
Figure 6 is an enlarged top plan view of one of the automatic control boxes as viewed as in Figure 2 with the top cover removed.
Figure 8:
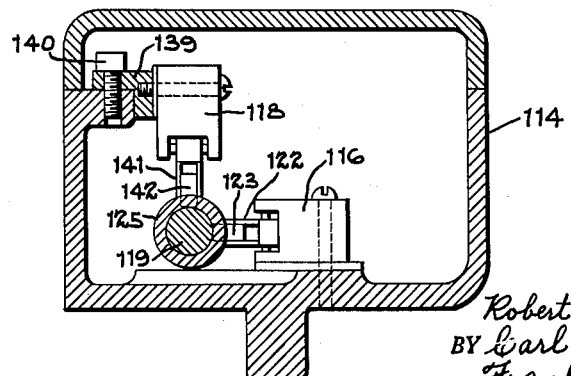
Figure 8 is a sectional view taken on line 8—8, Figure 6, detailing the tripping mechanism for the rapid traverse and safety switches of the control box.

The safety switch 118 is mounted upon a slotted adjustment bracket 139 clamped by screws 140 in adjusted position (Figures 6 and 8). It includes a stem 141 having a roller 142 tracked upon the plunger 119. Due to the position of the roller 142, the safety switch is normally inoperative. However, in the event that the control system should fail, the safety switch will be tripped before any damage can be inflicted upon the control unit or other parts of the machine.

During the final movement of plunger 119 during positioning, the plunger 119 actuates the pointer of the dial indicator and picks up several thousandths of an inch in traveling from pre-set position back to zero, to indicate that the sliding member has reached final position. The structure is arranged to be adjusted so that the dial pick up may be varied; in practice, the pointer is often set five thousandths from zero because this provides a movement of one half turn of the pointer around the dial.

The dial indicator is operated in the unloading direction as disclosed in the copending application in order to prevent it from being damaged by shocks. For this purpose the stem 143 of the dial is engaged against an abutment finger 144 which is mounted upon a slide rod 145.

The slide rod is urged toward the stem by the compression spring 146 and the abutment finger includes a downward extension having an abutment screw 147 adapted to be engaged by the pin 148 of plunger 119. The abutment finger, being spring urged against the stem, normally holds the pointer of the dial indicator away from its zero setting by depressing the stem. The pin 148 contacts the screw 147 just before the positioning switch is tripped at the end of the cycle and by adjusting the screw, the desired indicator movement, for example five thousandths, can be provided during the final movement of the plunger.

The dial indicator is further provided with a latch 150 similar to that disclosed in the copending application. This latch is arranged to lock the abutment finger 144 out of engagement with the stem 143 if the plunger 119 is depressed substantially beyond the normal travel of stem 143. The latch 150 consists of a spring loaded plunger 151 having a lower end 152 slidably engaged against a flat 153 milled in the end of slide rod 145. When the rod is depressed beyond the prescribed limit, the latch 150 will snap downwardly in the path of travel of the slide rod. If the rod is then released it will strike the plunger 151 before contacting stem 143, thus preventing shock and possible damage to the delicate mechanism of the dial indicator.

*Electrical system*

The electrical system illustrated in Figure 14 is in duplicate for the table and slide and the two circuits are arranged to operate independently of one another. The circuit is generally similar to that of the prior application, but differs in that it is arranged to energize the clutches and regulate the direction of motor rotation instead of controlling two separate motors.

Figure 12:
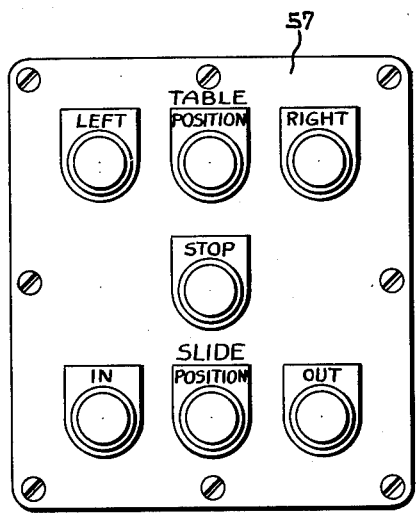
Figure 12 is a top plan view of the switch box showing the arrangement of the control buttons for operating the positioning apparatus.

The movements executed by the table are indicated in the motion diagram Figure 13 and it will be understood that the slide movements are the same except that the rapid traverse rate is greater for the table because of its longer travel range. In the motion diagram, the arrow indicated at L and R represents the rapid traverse movement of the table to the left and right through the gear train drive when the Left and Right push buttons are depressed at the control station (Figure 12). Since the control box 51 for the table is located at the right end of the slide, automatic operation of the table is always to the right, that is, toward the measuring rods and control box. In setting up the machine, the table is shifted to the left to permit insertion of the measuring rods and is then placed under automatic operation by depressing the positioning button indicated at P in the diagram, causing movement to the right under control of the positioning cycle.

After the measuring rods are placed and the positioning button depressed, the automatic cycle is initiated and the table immediately starts moving toward the right at the rapid traverse rate of 72 inches per minute until it contacts and displaces the measuring rods and trips the rapid traverse switch 116. This switch disengages the rapid traverse clutch 63 and engages the positioning clutch 61, causing the table advancement to continue to the right at the rate of .415 inch per minute. In the present example the table advances at rapid traverse speed until it comes within 1/8 inch of its final position. When the positioning switch is tripped at final position, the table motor is plugged to a stop and reversed for a sufficient number of turns to introduce backlash in the screw threads of shaft 39. The table is then clamped in fixed position for the machining operation.

The above outlined mode of operation is the same with respect to the movements of the slide except that the rapid traverse slide rate is 36 inches per minute due to its shorter travel range. It will also be noted that the slide is arranged always to move outwardly toward the control box 50 when the positioning button is depressed in order to actuate the switches in the manner outlined above.

The electrical circuit illustrated in Figure 14 is intended to represent a typical control system although it will be apparent that other arrangements can be adapted to the same purpose. The table and slide circuits are substantially identical and the following description is limited to the table circuit for simplicity. The various electrical components shown in the diagram are well-known commercial products and are not illustrated or explained in detail. For convenience in tracing the circuit, the various electrical contacts are placed in the lines which the contacts energize and are separated from the relay coils which actuate them. The various relay coils and their contacts are indicated diagrammatically to the right of the diagram in order to correlate the coils with the contacts operated by them.

The control circuit for the relays is energized by the low voltage transformer 155 having one lead 156 connected in common to one terminal of all the relay coils. The second transformer lead 157 completes the circuit to the relay coils through the manual Stop button by way of the automatic and manual switches as later described. When the Left button is depressed, a circuit is established from line 157 by way of line 158, through the normally closed contact of the Left Safety Limit switch to the L relay winding. This winding closes the L contacts which connect the three phase power lines 160 to the table motor, energizing the motor in a direction to move the table toward the left at the rapid traverse rate.

It is to be noted at this point that when the Left button is depressed, a circuit is also completed to energize and engage the rapid traverse clutch. This circuit is established by the L contact in branch line 161 which closes when the L relay is energized and energizes relay CR-3 by way of line 159. Upon being energized, CR-3 closes the CR-3 contact in power line 162 which energizes the coil of the rapid traverse clutch. The power circuit for energizing the clutches is shown to the right of diagram and is described later. It will be apparent at this point that the motor will continue running in the left direction with the rapid traverse clutch engaged only so long as the left button is held down.

When the Right push button is depressed, a circuit is established from line 157 by way of line 163 through the closed Right Safety Limit switch and Position switch 117 of the control box to relay coil R, causing the R motor contacts of the power lines 160 to close. This energizes the motor in a direction to traverse the table toward the right and also energizes CR-3 by way of the R contact in branch line 161. The rapid traverse clutch is therefore engaged and the motor energized for right table travel so long as the Right button is held down.

It is to be noted at this point that the left and right safety limit switches 164 and 165 in lines 158 and 163 are arranged to open the circuit and deenergize the motor when the table travels beyond its normal limits to the right or left. These switches are mounted upon the table at opposite ends with their operating stems adapted to be tripped by the fingers 166 at the limits of travel as indicated in Figure 2.

When the automatic Position button is depressed, a circuit is established from line 157 by way of line 167 to the coil of relay CR-1. CR-1 closes the contact CR-1 in line 163 shunting the Right button and energizing the winding of relay R in the manner as above described, causing table movement toward the right. Upon being energized, relay CR-1 also closes the holding contact CR-1 in line 168, by-passing the Position button so as to keep the circuit closed after the Position button is released. This circuit is completed by the R contact in line 168, which also closes when the R relay is energized. The R relay also closes the R contact in line 161, energizing relay CR-3 and causing the rapid traverse clutch to be engaged by way of the CR-3 contact in power line 162.

After the Position button is depressed, relays R, CR-1 and CR-3 remain energized through the holding circuit and the table thus continues to move toward the right at the rapid traverse rate. When the measuring rods are contacted toward the end of the cycle, the double throw rapid traverse switch 116 of line 161 is tripped to its second position, completing the circuit from lines 157 to line 170 to energize relay CR–2 and deenergize relay CR–3. This opens contact CR–3 in power line 162 disengaging the rapid traverse clutch and closes contact CR–2 in power line 171 to engage the positioning clutch. The motor continues to run at the same speed and in the same direction but the positioning clutch now causes the table to be shifted at positioning speed through the worm drive as indicated in the motion diagram.

The table will continue moving at the slow rate until the positioning switch 117 in line 163 is tripped to deenergize the R relay coil. This opens the R contacts of the motor (power lines 160) and opens the R contact in line 161, deenergizing relay CR–2. This opens the contact CR–2 in power line 171, causing the positioning clutch momentarily to be disengaged.

At this point a circuit is established which plugs the motor to a quick stop then reverses it for a slight back roll to introduce the back lash in the screw threads. For this purpose, a time delay relay coil TR is connected in parallel with R relay in line 163 and is energized concurrently with the R relay. Relay TR has a contact TR in the plugging line 172, adapted temporarily to energize the L motor relay. The TR contact is normally open and a normally closed contact R also is inserted in line 172. Therefore the TR contact will be closed and the R contact will be open while the table is traveling toward the right, and R and TR relays both being energized.

When the positioning switch 117 is opened at final position, deenergizing the R relay, the normally closed R contact of line 172 will immediately close; however, TR contact will remain closed for a predetermined period because of the time delay inherent in the TR relay operation. This delay causes the L relay coil to be energized through the now closed R and TR contacts in line 172, the time delay being just sufficient to plug the motor to a stop and then to reverse its direction so as to relieve the screw shaft.

Since the L relay is energized when the R relay is deenergized, the circuit to the positioning clutch is interrupted only momentarily. As soon as the L relay is energized, it closes the L contact in line 161 and completes the circuit to relay CR–2 so as to keep the positioning clutch engaged during the plugging and reversal of the motor.

The time delay relay TR may be one of several types which are well-known in the electrical industry and its structure is not disclosed in detail. After relay TR times out, the contact TR opens, causing the L motor relay to deenergize and open the motor contacts L. This brings the motor to a stop and also opens the L contact of line 161, deenergizing CR–2. This causes the contact CR–2 of line 171 to open and deenergize the positioning clutch. The table is now in final position ready to be clamped for the machining operations.

The safety switches 118 of the control boxes are arranged to prevent damage to the control boxes and associated parts if for some reason the components of the circuit should stick or fail. For this purpose the switches of both indicator boxes are interposed in the line 173 leading to the safety relay S. The normally closed contacts S of this relay are interposed in the power lines 160, the arrangement being such that should either of the safety limit switches be tripped, relay S will be deenergized. This will open the S contacts and deenergize the entire system.

The rapid traverse and positioning clutches in the present instance are energized by direct current. The current is supplied by a transformer 174 having one winding connected across two of the A. C. power lines 160. The other winding of the transformer energizes a bridge rectifier 175, the transformer and rectifier being arranged to provide a 90 volt direct current. A line 176 extends from one terminal of the rectifier and is connected in common to the terminals of the coils of the rapid traverse and positioning clutches. A control potentiometer 177 is interposed in line 176 to regulate current flow. The opposite side of the rectifier is connected by way of line 178 to the lines 162 and 171 to complete the circuit through the CR–2 and CR–3 contacts to the opposite terminals of the clutch windings.

The slide control circuit is substantially the same as the table circuit and both can be energized at the same time to speed up the positioning cycle. As shown, the control voltage for the slide is by way of the lines 156 and 157 extending from the transformer 155. The various components of the slide circuit are located in the slide diagram in positions corresponding to the table diagram. It is also to be noted at this point that the Stop button of the control station is interposed in the line 157 and thus deenergizes the entire circuit for the table and slide upon being depressed. This causes the holding relays to open their circuits bringing the motors to a stop and preventing further operation until the circuit is reestablished by the manual or positioning buttons.

The slide and table speeds disclosed in the specification and drawings are intended to illustrate the characteristics of the invention in its preferred embodiment. It will be apparent that the apparatus will be varied according to the requirements of the various other machines to which the apparatus is applied.

Having described our invention, we claim:

1. In a machine tool having a bed, a table translatably mounted upon the bed, and a rotatable lead screw journalled relative to the bed and having a nut threaded thereon, said nut being connected to the table and effective to translate the same upon rotation of the lead screw; a positioning apparatus for rotating the lead screw in sequence at a rapid traverse rate and at a relatively slow positioning rate comprising, a motor mounted relative to the bed, a countershaft rotatably journalled relative to the bed, drive means connecting the countershaft to the motor, a rapid traverse driving system including a traverse clutch mounted upon the countershaft, a drive gear loosely journalled upon the countershaft and connected to said clutch, means in said clutch establishing a driving connection from the countershaft to said drive gear when the clutch is engaged, a traverse gear train rotatably journalled relative to the bed, said gear train meshing with said drive gear and including a gear fixed to the lead screw for rotating the lead screw at said traverse rate when the traverse clutch is engaged, a positioning driving system connecting the countershaft to the lead screw, said positioning driving system including a worm fixed upon the countershaft and a worm wheel rotatably journalled upon said lead screw, a positioning clutch mounted upon the lead screw and connected to the said worm wheel, and means in the positioning clutch establishing a direct driving connection from the said worm wheel to the lead screw when the positioning clutch is engaged, the positioning clutch thereby providing a direct driving connection from the worm wheel journalled on the lead screw shaft for rotating the lead screw at positioning speed.

2. In a machine tool having a bed, a table translatably mounted upon the bed and a rotatable lead screw journalled relative to the bed and having a nut threaded thereon, said nut being connected to the table and effective to translate the same upon rotation of the lead screw; a positioning apparatus for rotating the lead screw in sequence at a rapid traverse rate and at a relatively slow positioning rate comprising, a motor mounted relative to the bed, a countershaft rotatably journalled relative to the bed, drive means connecting the countershaft to the motor, a rapid traverse driving system including a traverse clutch mounted upon the countershaft, a drive gear loosely journalled relative to the countershaft and connected to said clutch, means in said clutch establishing a driving connection from the countershaft to said drive gear when the clutch is engaged, a traverse gear train rotatably journalled relative to the bed, said gear train meshing with said drive gear and including a driven gear fixed to the lead screw for rotating the lead screw at said traverse rate when the traverse clutch is engaged, a positioning driving system including a worm fixed to the countershaft, a cross shaft journalled relative to the bed and extending at right angles between the lead screw and said countershaft, a worm wheel and worm fixed to the cross shaft, the worm wheel of the cross shaft meshing with the worm of the countershaft, a worm wheel rotatably journalled upon said lead screw and meshing with the worm of the cross shaft, a positioning clutch mounted upon the lead screw and connected to the worm wheel journalled on the lead screw, and means in the positioning clutch establishing a direct driving connection from the said worm wheel to the lead screw when the positioning clutch is engaged.

3. In a machine tool having a bed, a table translatably mounted on the bed, a rotatable lead screw journalled in the bed, a nut mounted on the table and in threaded engagement with the lead screw for translating the table upon rotation of the lead screw; a positioning apparatus for rotating the lead screw in sequence at a rapid traverse rate and at a relatively slow positioning rate, said positioning apparatus comprising, a transmission housing mounted relative to the bed, a countershaft rotatably journalled in said housing in parallelism with the lead screw, a motor mounted relative to the transmission housing and connected to the said countershaft for rotating the same, a rapid traverse driving system including a sleeve rotatably mounted upon the axis of said countershaft, a traverse clutch mounted upon the countershaft, said clutch including means for establishing a driving connection from the countershaft to the sleeve when the traverse clutch is engaged, a reduction gear train rotatably mounted in the transmission housing, said gear train including a driven gear fixed to the lead screw and a drive gear fixed upon said rotatable sleeve, said gear train providing a rapid traverse driving connection from the countershaft to the lead screw when the traverse clutch is engaged, a positioning driving system including a worm fixed to the said countershaft, a cross shaft rotatably journalled in the transmission housing and extending at right angles to the countershaft and disposed between the countershaft and lead screw, a worm wheel fixed upon the cross shaft and in mesh with the worm of the countershaft, a second worm fixed upon the cross shaft, a second worm wheel rotatably mounted upon the lead screw and in mesh with the said second worm, a positioning clutch mounted upon the lead screw, the positioning clutch including means establishing a direct driving connection between the second worm wheel and lead screw when the clutch is engaged.

4. In a machine tool having a bed, a table translatably mounted on the bed, a lead screw and nut relatively rotatable to effect said translation of the table, and a rotatable driven shaft to effect said relative rotation of the lead screw and nut; a positioning apparatus for rotating said driven shaft at a rapid traverse rate and at a relatively slow positioning rate, said positioning apparatus comprising, a transmission housing, a countershaft rotatably journalled in said housing in parallelism with the said driven shaft, a motor mounted relative to the transmission housing and connected to the said countershaft for rotating the same, a rapid traverse driving system including a sleeve rotatably mounted upon the axis of said countershaft, a traverse clutch mounted upon the countershaft, said clutch including means for establishing a driving connection from the countershaft to the sleeve when the clutch is engaged, a reduction gear train rotatably mounted in the transmission housing, said gear train including a driven gear fixed to the said driven shaft and a drive gear fixed upon said rotatable sleeve, said gear train providing a rapid traverse driving connection from the countershaft to the said driven shaft when the traverse clutch is engaged, a positioning driving system including a worm fixed to the said countershaft, a cross shaft rotatably journalled in the transmission housing and extending at right angles to the countershaft and disposed between the countershaft and said driven shaft, a worm wheel fixed upon the cross shaft and in mesh with the worm of the countershaft, a worm fixed upon the cross shaft, a second worm wheel rotatably mounted upon the said driven shaft and in mesh with the worm of the cross shaft, a positioning clutch mounted upon the said driven shaft, the positioning clutch including means establishing a direct driving connection between the second worm wheel and the driven shaft when the clutch is engaged, thereby providing a direct driving connection from the second worm wheel to the driven shaft.

5. In a machine tool having a bed, a table translatably mounted upon the bed and a lead screw journalled relative to the bed and having a nut threaded thereon, said nut being connected to the table and effective to translate the same upon rotation of the lead screw; a positioning apparatus for rotating the lead screw in sequence at a rapid traverse rate and at a relatively slow positioning rate comprising, an electric motor mounted relative to the bed, a countershaft rotatably journalled relative to the bed, drive means connecting the countershaft to the motor, a rapid traverse driving system including an electrically operated traverse clutch mounted upon the countershaft, a drive gear loosely journalled relative to the countershaft and connected to said clutch, means in said clutch establishing a driving connection from the countershaft to said drive gear when the clutch is energized, a traverse gear train rotatably journalled relative to the bed, said gear train meshing with said drive gear and including a driven gear fixed to the lead screw for rotating the lead screw at said traverse rate when the traverse clutch is energized, a positioning driving system including a worm fixed to the countershaft, a cross shaft journalled relative to the bed and extending at right angles between the lead screw and said countershaft, a worm wheel and worm fixed to the cross shaft, the worm wheel of the cross shaft meshing with the worm of the countershaft, a worm wheel rotatably journalled upon said lead screw and meshing with the worm of the cross shaft, an electrically operated positioning clutch mounted upon the lead screw and connected to the worm wheel journalled on the lead screw, means in the positioning clutch providing a direct driving connection from the said worm wheel to the lead screw when the positioning clutch is energized, a manually operated switch electrically interconnected with the traverse clutch for energizing the same, a control switch mounted relative to the bed in a position to be actuated by the table in response to table translation to a predetermined position, electrical means interconnecting said switch with the traverse and positioning clutches deenergizing the traverse clutch and energizing the positioning clutch in response to table translation to said predetermined position, a second control switch mounted relative to the bed in a position to be actuated by the table when the table reaches a predetermined final position, and electrical means interconnecting the second control switch deenergizing the positioning clutch upon actuation of the second control switch, thereby to stop the table at said final position.

6. In a machine tool having a bed, a table translatably mounted upon the bed and a lead screw journalled relative to the bed and having a nut threaded thereon, said nut being connected to the table and effective to translate the same upon rotation of the lead screw; a positioning apparatus for rotating the lead screw in sequence at a rapid traverse rate and at a relatively slow positioning rate comprising, an electric motor mounted relative to the bed, a countershaft rotatably journalled relative to the bed, drive means connecting the countershaft to the motor, a rapid traverse driving system including an electrically operated traverse clutch mounted upon the countershaft, a drive gear loosely journalled relative to the countershaft and connected to said clutch, means in said clutch establishing a driving connection from the countershaft to said drive gear when the clutch is energized, a traverse gear train rotatably journalled relative to the bed, said gear train meshing with said drive gear and including a driven gear fixed to the lead screw for rotating the lead screw at said traverse rate when the traverse clutch is energized, a positioning driving system including a worm fixed to the countershaft, a cross shaft journalled relative to the bed and extending at right angles between the lead screw and said countershaft, a worm wheel and worm fixed to the cross shaft, the worm wheel of the cross shaft meshing with the worm of the countershaft, a worm wheel rotatably journalled upon said lead screw and meshing with the worm of the cross shaft, an electrically operated positioning clutch mounted upon the lead screw and connected to the worm wheel journalled on the lead screw, means in the positioning clutch providing a direct driving connection from the said worm wheel to the lead screw when the positioning clutch is energized, a manually operated switch electrically interconnected with the traverse clutch and motor for energizing the same, a control switch mounted relative to the bed in a position to be actuated by the table in response to table translation to a predetermined position, electrical means interconnecting said switch with the traverse and positioning clutches deenergizing the traverse clutch and energizing the positioning clutch in response to table translation to said predetermined position, a second control switch mounted relative to the bed in a position to be actuated by the table when the table reaches a predetermined final position, and an electrical control circuit interconnected with the second control switch including means reversing motor rotation upon actuation of said switch at said final position, said reversal relieving relative stress between the lead screw and nut, said means including timing means deenergizing the positioning clutch and motor after said reversal and before the table is shifted from said final position.

References Cited in the file of this patent
UNITED STATES PATENTS
2,481,383   Bickel et al. _____ Sept. 6, 1949